US008223690B2

(12) United States Patent
Kwon

(10) Patent No.: US 8,223,690 B2
(45) Date of Patent: Jul. 17, 2012

(54) METHOD AND SYSTEM FOR PROVIDING STREAMING SERVICE

(75) Inventor: Taek Jung Kwon, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 675 days.

(21) Appl. No.: 12/351,090

(22) Filed: Jan. 9, 2009

(65) Prior Publication Data
US 2009/0176458 A1 Jul. 9, 2009

(30) Foreign Application Priority Data
Jan. 9, 2008 (KR) ........................ 10-2008-0002679

(51) Int. Cl.
*H04W 4/00* (2009.01)
*H04J 1/00* (2006.01)
(52) U.S. Cl. ......... 370/328; 370/329; 370/341; 370/343
(58) Field of Classification Search .................. 370/328, 370/329, 341, 343; 455/69
See application file for complete search history.

(56) References Cited

U.S. PATENT DOCUMENTS

| 7,158,792 B1 * | 1/2007 | Cook et al. ..................... 455/450 |
| 7,970,920 B1 * | 6/2011 | Dinan ............................ 709/230 |
| 2002/0091762 A1 * | 7/2002 | Sohn et al. ..................... 709/203 |
| 2003/0126198 A1 * | 7/2003 | Tenereillo et al. ............. 709/203 |
| 2005/0063355 A1 * | 3/2005 | Iwamura ........................ 370/351 |
| 2005/0180415 A1 * | 8/2005 | Cheung et al. ................. 370/389 |
| 2005/0181830 A1 * | 8/2005 | Lee ................................ 455/561 |
| 2007/0094490 A1 * | 4/2007 | Lohr .............................. 713/153 |
| 2007/0136446 A1 * | 6/2007 | Rezvani et al. ............... 709/219 |
| 2007/0249390 A1 * | 10/2007 | Purkayastha et al. ...... 455/552.1 |
| 2008/0096552 A1 * | 4/2008 | Won et al. ................... 455/426.1 |
| 2008/0244038 A1 * | 10/2008 | Martinez ....................... 709/218 |
| 2008/0261529 A1 * | 10/2008 | Rosenblatt ................... 455/41.3 |
| 2009/0111378 A1 * | 4/2009 | Sheynman et al. .......... 455/41.1 |
| 2009/0157834 A1 * | 6/2009 | Krishnaswamy ............. 709/206 |
| 2009/0307757 A1 * | 12/2009 | Groten ............................. 726/4 |
| 2012/0047201 A1 * | 2/2012 | Jain ............................... 709/203 |

* cited by examiner

Primary Examiner — Chi Pham
Assistant Examiner — Farah Faroul
(74) Attorney, Agent, or Firm — Cha & Reiter, LLC

(57) ABSTRACT

A streaming service method and system of the present invention is provided for improving service quality and reliability by transmitting data through an optimal wireless link selected among multiple wireless links available between a server and a client. A streaming service method for a system including a server and at least one client that can establish more than two wireless links with each other includes sending a link selection request message containing a content identifier from the client to the server; selecting, at the server, one of the wireless links for transmitting a content indicated by the content identifier; sending a link selection response message containing a link identifier of the selected wireless link from the server to the client; and receiving, at the client, the content transmitted by the server through the wireless link established with reference to the link identifier.

22 Claims, 9 Drawing Sheets

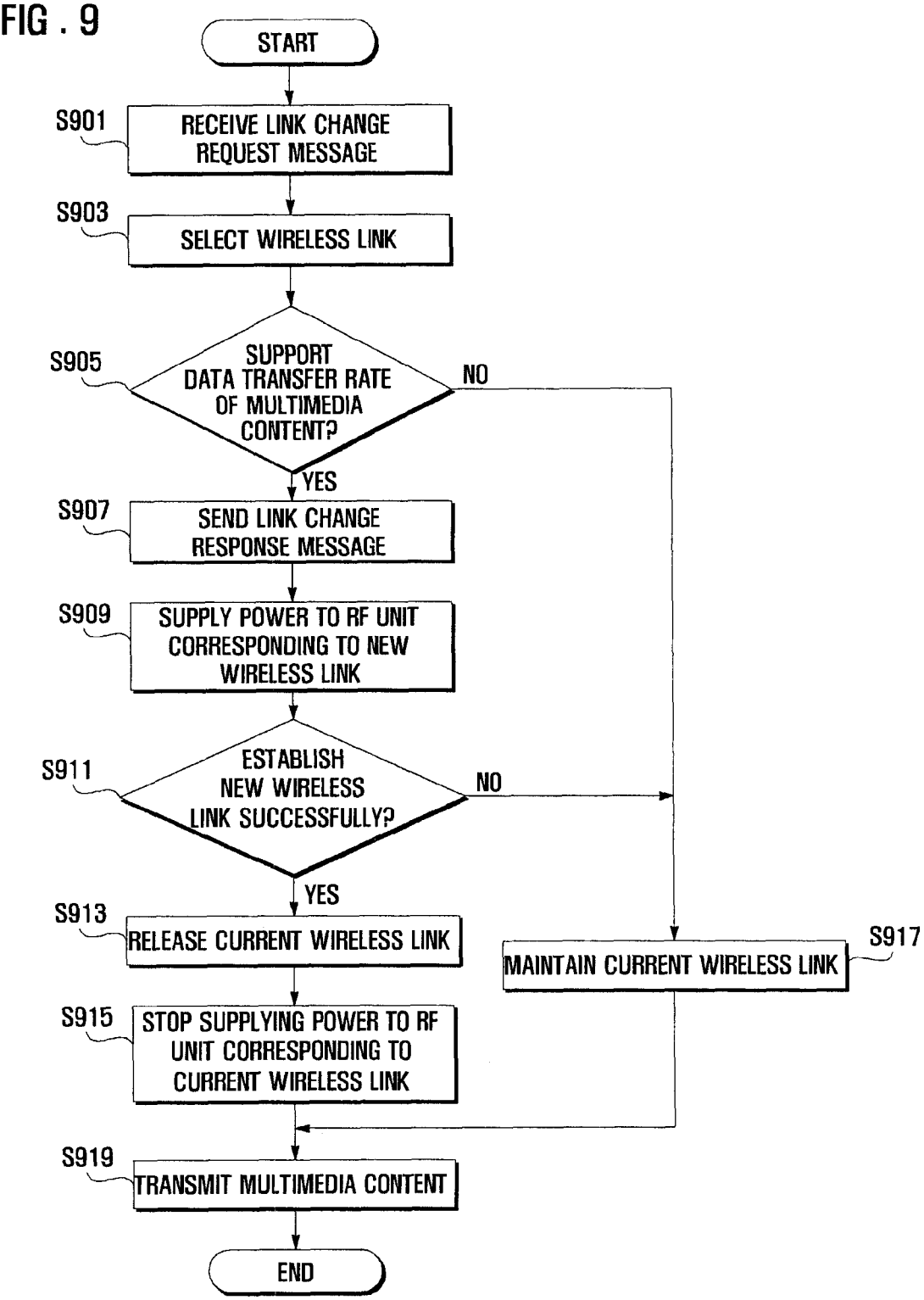

METHOD AND SYSTEM FOR PROVIDING STREAMING SERVICE

CLAIM OF PRIORITY

This application claims the benefit of the earlier filing date, pursuant to 35 USC 119, to that patent application entitled "METHOD AND SYSTEM FOR PROVIDING STREAMING SERVICE," filed in the Korean Intellectual Property Office on Jan. 9, 2008 and assigned Serial No. 10-2008-0002679, the contents of which are incorporated herein by reference.

BACKGROUND OF THE INVENTION

1. Field of the Invention

The present invention relates to a multimedia streaming service and, in particular, to a streaming service method and system for improving service quality and reliability of the streaming service.

2. Description of the Related Art

With the popularization of portable multimedia devices such as mobile phone, Personal Digital Assistant (PDA), Personal Multimedia Player (PMP), and MP3 player, people can enjoy multimedia contents even on the move, e.g., in a car, on a bus or train. Typically, such a portable device is provided with a storage medium, such as a compact hard disc or flash memory, for storing multimedia contents. Recently, the portable devices are equipped with a wireless communication interface for Wireless Local Area Network (WLAN), Bluetooth, Ultra Wideband (UWB), and the like. These communication-enabled portable devices are configured to play contents input through the radio channel in real time as well as the contents stored therein. More recently, advanced portable devices having multiple radio communication interfaces are emerged in the market. For instance, it is not difficult to find the mobile phones and PDAs supporting both the WLAN and Bluetooth technologies.

When one device receives a content provided by another device, they typically operate in server/client relationship. In the conventional client/server system, in order for the client to play the content transmitted by the server, particularly through a radio channel, the content should be completely downloaded. However, such a download-and-play method has shortcomings in that the client device must have a storage large enough for storing the whole content and must wait before playing the content until the content is completely downloaded. In order to overcome the shortcomings of the download-and-play method, a streaming method has been proposed. In the streaming method, the client device can present the content delivered by the server device constantly in real time.

However, the streaming method has drawbacks such as large energy consumption and unstable media playback in comparison with the download-and-play method.

SUMMARY OF THE INVENTION

The present invention provides a streaming service method and system that is capable of improving consistent quality and reliability of streaming content and reducing energy consumption.

In accordance with an exemplary embodiment of the present invention, a streaming service method for a system including a server and at least one client that can establish more than two wireless links with each other, includes sending a link selection request message containing a content identifier from the client to the server, selecting, at the server, one of the wireless links for transmitting a content indicated by the content identifier, sending a link selection response message containing a link identifier of the selected wireless link from the server to the client and receiving, at the client, the content transmitted by the server through the wireless link established with reference to the link identifier.

In one aspect, selecting one of the wireless links includes checking data transfer rates and power consumption factors of the wireless links and selecting the wireless link of which the data transfer rate is greater than the data transfer rate of the content and the power consumption factor is less than that of the other wireless links.

In one aspect, the data transfer rate is one of a maximum data transfer rate, a practical data transfer rate, and a previously measured data transfer rate of the wireless link.

In one aspect, the wireless links include a Wireless Local Area Network (WLAN) link, a Bluetooth link, and an Ultra Wideband (UWB) link.

In accordance with another exemplary embodiment of the present invention, a streaming service method for a system including a server and at least one client that can establish more than two wireless links with each other includes determining, at the client, whether a data stream of a content receiving from the server is cut off, sending, if the data stream is cut off, a link change request message from the client to the server, selecting, at the server, one of the wireless links except for a current wireless link upon receiving the link change request message, sending a link change response message containing a link identifier of the selected wireless link from the server to the client, switching the current wireless link to the selected wireless link between the client and the server and receiving, at the client, the content transmitted by the server through the selected wireless link.

In one aspect, selecting one of the wireless links includes selecting the wireless links of which the data transfers rates are greater than the data transfer rate of the content and selecting the wireless link of which the power consumption factor is less than that of the other wireless links. In one aspect, the data transfer rate is one of a maximum data transfer rate, a practical data transfer rate, and a previously measured data transfer rate of the wireless link. In one aspect, the wireless links includes a Wireless Local Area Network (WLAN) link, a Bluetooth link, and an Ultra Wideband (UWB) link.

In accordance with another exemplary embodiment of the present invention, a streaming service system includes a server which selects, when received a link selection request message, one of wireless links for transmitting a content indicated by a content identifier contained in the link selection request message and sends a link selection response message containing a link identifier indicating the selected wireless link in response to the link selection request message and a client which sends the link selection request message to the server and receives a data stream of the content transmitted by the server through the wireless link indicated by the link identifier contained in the link selection response message.

In one aspect, the server selects the wireless link of which data transfer rate is greater than the data transfer rate of the content and power consumption factor is less than those of the other wireless links.

In one aspect, the data transfer rate is one of a maximum data transfer rate, a practical data transfer rate, and a previously measured data transfer rate of the wireless link.

In one aspect, the client detects whether the data stream is cut off and sends, if the data stream is cut off, a link change request message to the server.

In one aspect, the server selects, after receiving the link change request message, one of the wireless links except for the current wireless link and sends the client a link change response message containing a link identifier indicating the selected wireless link.

In one aspect, the server selects the wireless links of which the data transfers rates are the data transfer rate of the content and selects the wireless link of which the power consumption factor is less than that of the other wireless links.

In one aspect, the client receives the content through the wireless link indicated by the link identifier contained in the link change response message.

In one aspect, the wireless links comprise a Wireless Local Area Network (WLAN) link, a Bluetooth link, and an Ultra Wideband (UWB) link.

In accordance with another exemplary embodiment, of the present invention, a server for a system providing a streaming service includes a plurality of radio frequency modules which establish individual wireless links, a link control module which selects one of the radio frequency modules and a controller which selects a wireless link to transmit a content and controls the link control module to activate the radio frequency module which is responsible for establishing the selected wireless link.

In one aspect, the server further includes a storage module that stores the content, wherein the controller controls the transmission of the content through the wireless link established by means of the activated radio frequency module.

In accordance with another exemplary embodiment of the present invention, a client for a system providing a streaming service includes a plurality of radio frequency units which establish individual wireless links, a link selection unit which selects one of the radio frequency units for receiving a content transmitted by a server and a control unit which controls the link selection unit to activate the radio frequency module for establishing the wireless link indicated by a link selection message received from a server.

In one aspect, the client further includes an audio processing unit that processes an audio stream of the content receiving from the server and a display unit that displays a video stream of the content, wherein the control unit controls the activated radio frequency to output the audio and video streams of the content to the respective audio processing unit and the display unit.

In one aspect, the control unit controls the link selection unit to send a link change request message to the server, when the audio or video stream is cut off.

BRIEF DESCRIPTION OF THE DRAWINGS

The above and other objects, features and advantages of the present invention will be more apparent from the following detailed description in conjunction with the accompanying drawings, in which:

FIG. 9 is a flowchart illustrating a wireless link switching procedure of a multimedia streaming service method in view of a server according to an exemplary embodiment of the present invention.

DETAILED DESCRIPTION OF THE INVENTION

Embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
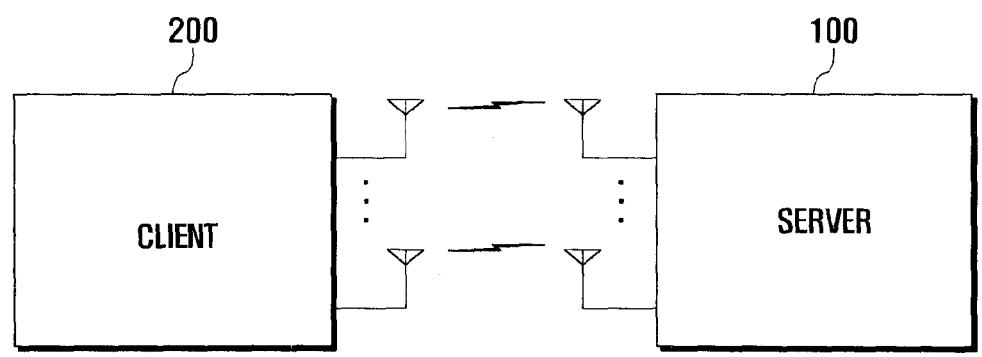
FIG. 1 is a schematic diagram illustrating a multimedia streaming service system according to an exemplary embodiment of the present invention.

First, a multimedia streaming service system according to an exemplary embodiment of the present invention is described. FIG. 1 is a schematic diagram illustrating a multimedia streaming service system according to an exemplary embodiment of the present invention.

Referring to FIG. 1, a multimedia streaming stream according to an exemplary embodiment of the present invention is a system for providing subscribers with multimedia content files. The multimedia streaming service system includes a multimedia server (hereinafter called server) 100 delivering the multimedia contents in the form of a multimedia data stream and at least one multimedia client (hereinafter called client) 200 which receives and plays the multimedia stream.

The server is provided with more than two different radio interfaces operating with different communication protocols for establishing wireless links with the client 200. The communication protocols may include at least one of a WLAN protocol, a Bluetooth protocol, and a UWB protocol.

In this embodiment, the server 100 selects a wireless link that is maintained with the least power consumption among the wireless links established with the client 200. When the current wireless link becomes unstable, the wireless link can be switched to another wireless link for securing the stability of the streaming service.

Now, the structures of the server 100 and the client 200 are described in detail.

Figure 2:
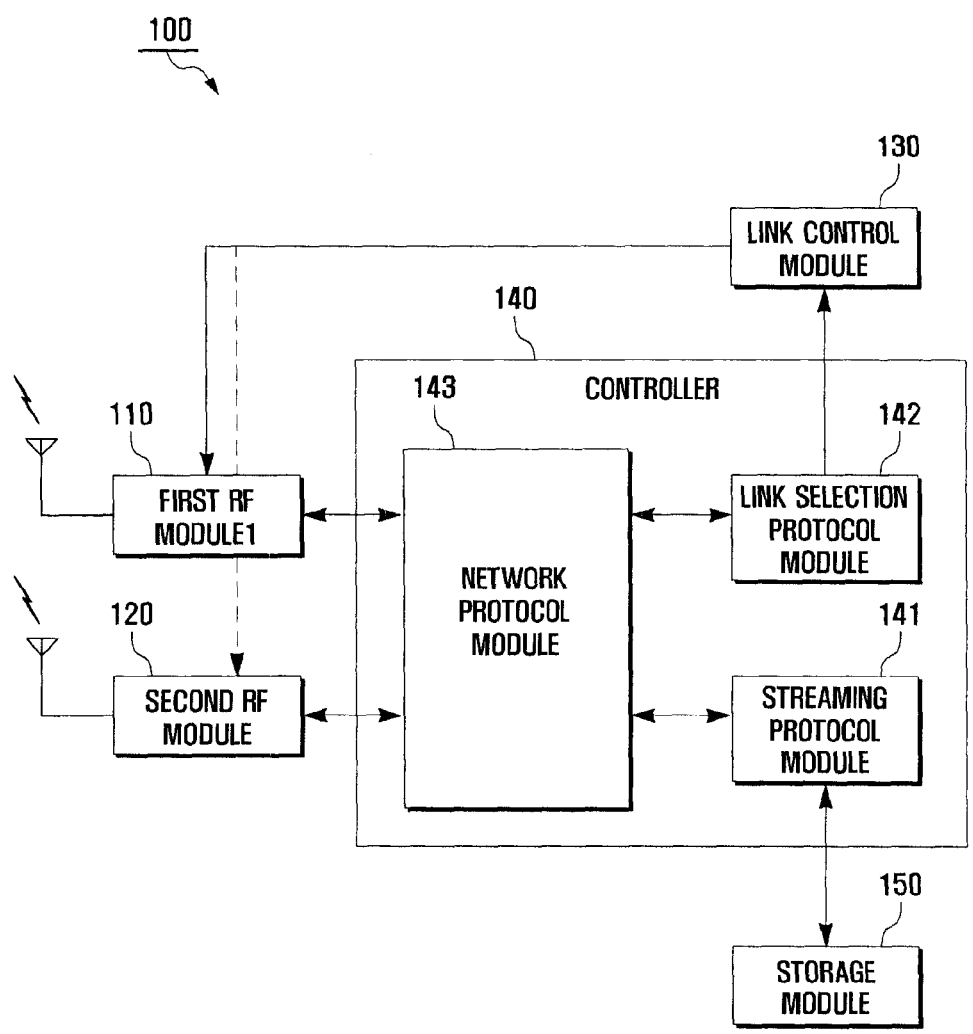
FIG. 2 is a block diagram illustrating a configuration of the server 100 of FIG. 1.

FIG. 2 is a block diagram illustrating a configuration of the server 100 of FIG. 1.

Referring to FIG. 2, the server 100 includes first and second RF modules 110 and 120, a link control module 130, a controller 140, and a storage module 150.

The first and second RF modules 110 and 120 operate with different radio communication protocols on different frequencies. The multimedia data stream is transmitted over one of the two wireless links established by means of the first and second RF modules 110 and 120, and the link control module 130 outputs a control signal to select one of the two wireless links.

The radio communication protocols can be a pair selected among the WLAN, Bluetooth, UWB, and their equivalent protocols. In this embodiment, the first RF module 110 operates on the radio frequency of WLAN, and the second RF module 120 operates on the radio frequency of Bluetooth.

The link control module 130 outputs a control signal to the first and second RF modules 110 and 120 to establish a wireless link by means of one of the first and second RF modules 110 and 120.

The controller 140 reads the multimedia data from the storage module 150 and transmits the multimedia data through one of the first and second RF modules 110 and 120. The controller 140 includes a streaming protocol module 141, a link selection protocol module 142, and a network protocol module 143.

The streaming protocol module 141 encodes the multimedia data read from the storage module 150 according to a streaming protocol. The streaming protocol can be any of a Real-time Transport Protocol (RTP), a Real-time Control Protocol (RTCP), a Real-Time Streaming Protocol (RTSP), and the like.

The link selection protocol module 142 is responsible for selecting an optimal wireless link. The link selection protocol module 142 generates a link selection response message (Link_Select_Rsp message) in response to a link selection request message (Link_Select_Req message) sent by the client 200. The link selection protocol module 142 also generates a link change response message (Link_Change_Res) in response to a link change request message (Link_Change_Req message) sent by the client 200.

The link selection protocol module 142 outputs the Link_Select_Res and Link_Switch_Res to the link control module 130 such that the link control module 130 generates a control signal based on the Link_Select_Res and Link_Switch_Res and sends the control signal to the first and second RF modules 110 and 120 for activating one of the first and second RF modules 110 and 120.

The network protocol module 143 encodes the data and message output by the streaming protocol module 141 and the link selection protocol module 142 according to a network protocol. The network protocol can be a Transmission Control Protocol/Internet Protocol (TCP/IP). The encoded data and message are sent to one of the first and second RF module 110 and 120.

The storage module 150 stores the contents (or multimedia data) such as audio and video data.

Figure 3:
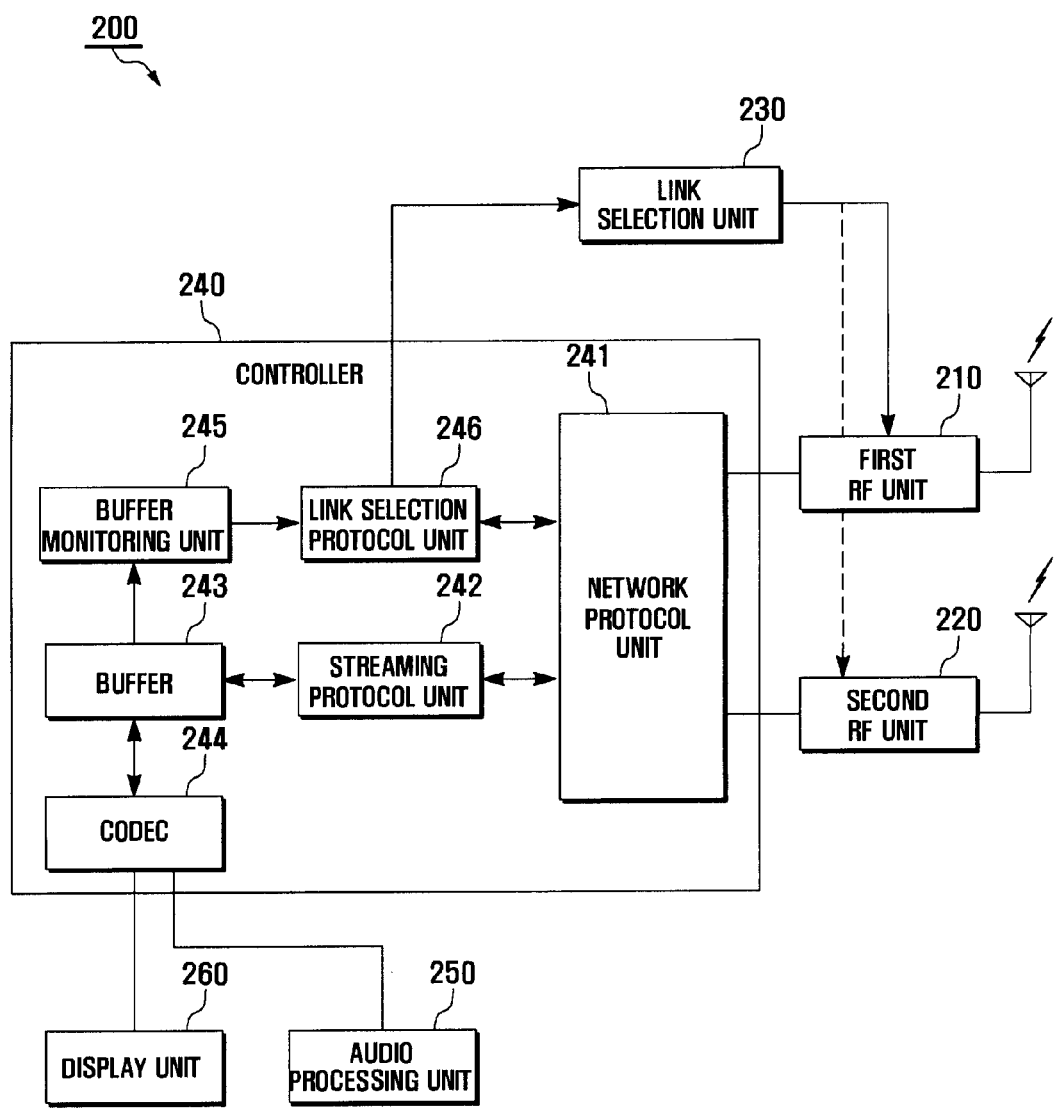
FIG. 3 is a block diagram illustrating a configuration of the client 200 of FIG. 1.

FIG. 3 is a block diagram illustrating a configuration of the client 200 of FIG. 1.

Referring to FIG. 3, the client 200 includes first and second RF units 210 and 220, respectively, a link selection unit 230, a control unit 240, an audio processing unit 250, and a display unit 260.

The first and second RF units 210 and 220 are responsible for establishing wireless links with the server 100 according to designated radio communication protocols. The first and second RF units 210 and 220 operate with different communication protocols. The first and second RF units 210 and 220 are selectively activated according to a control signal output by the link selection unit 230. Particularly, the first and second RF unit 210 and 220 are correspondent with the first and second RF modules 110 and 120, respectively. That is, in one aspect of the invention, the first RF unit 210 supports WLAN access, and the second RF unit 220 supports the Bluetooth access.

The link selection unit 230 outputs a control signal to the first and second RF units 210 and 220 for selecting one of the two RF units under the control of the control unit 240.

The control unit 240 analyzes a status of the data input to a buffer 243 and determines whether to switch the wireless link based on the status of the data. The control unit 240 also controls such that the RF unit is selected to achieve an optimal link quality for securing quality of the streaming service.

For this purpose, the control unit 240 includes a network protocol unit 241, a streaming protocol unit 242, a buffer 243, a codec 244, a buffer monitoring unit 245, and a link selection protocol unit 246.

The network protocol unit 241 receives the data input by one of the first and second RF unit 210 and 220 and decodes the received data according to the network protocol. The network protocol unit 241 also encodes the data and message input by the streaming protocol unit 242 and the link selection protocol unit 246 according to the network protocol. The network protocol can, for example, be the TCP/IP.

The streaming protocol unit 242 decodes the data received according to the streaming protocol and inputs the decoded data to the buffer 243. The streaming protocol can be one of the RTP, RTCP, RTSP, and the link.

The buffer 243 receives the data input by the streaming protocol unit 242 and outputs the data to the codec 244 at an appropriate rate.

The codec 244 decodes the data output from the buffer 243 to output the decoded data. The data can be the audio and video data. In one aspect of the invention, the codec 224 is provided with an audio codec and a video codec. The codec 244 outputs the decoded audio data to the audio processing unit 250 and outputs the decoded video data to the display unit 260.

The buffer monitoring unit 245 monitors the buffer 243 to detect whether the data stream is cut off. The buffer 243 outputs the data in unit of predetermined block size. In a case that at least one of the sequence numbers allocated to a series of data block is missed, a cut-off of the data stream can be predicted. In this embodiment, detecting the beak-off of the data stream is called "error detection." That is, the buffer monitor 245 is responsible for detecting the error.

The link selection protocol unit 246 is responsible for selecting an optimal wireless link. The link selection protocol unit 246 sends the Link_Select_Req message to the server 100 and receives the Link_Select_Rsp message from the server 100.

When an error is detected by the buffer monitoring unit 245, the link selection protocol unit 246 performs a wireless link switch. In order to switch the current wireless link to the other wireless link, the link selection protocol unit 246 outputs a control signal to the link selection unit 230 such that the link selection unit 230 sends the Link_Change_Req message to the server 100. In response to the Link_Chang_Req, the server 100 sends the Link_Change_Rsp message to the client 200.

The link selection protocol unit 246 generates a control signal based on the Link_Select_Rsp message and the Link_Change_Rsp message and sends the control signal to the first and second RF units 210 and 220 such that one of the RF units is activated to receive the signal transmitted by the server 100.

The audio processing unit 250 converts the audio data output by codec 244 into an analog audio signal and amplifies the analog audio signal to be output in the form of audible sound wave.

The display unit 260 converts the video data output by the codec 244 so as to be appropriately displayed on the screen (not shown).

Until now, the structures and functions of the server 100 and the client 200 of the multimedia streaming service system are described.

In this embodiment, the first and second RF module 110 and 120 of the server 100 correspond to the first and second RF unit 210 and 220 of the client 200, respectively. Accordingly, the first RF module 110 of the server 100 and the first RF unit 210 of the client 200 establish a first wireless link, and the second RF module 120 of the server 100 and the second RF unit 220 of the client establish a second wireless link.

The link selection procedure of the multimedia streaming service system is described hereinafter. Table 1 shows an exemplary play list transmitted by the server 100.

TABLE 1

| PLAY LIST | Transfer rate (bit rate) | Wireless Link 1 ELS = 500 kbps PCV = 20 | Wireless Link 2 ELS = 5 Mbps PCV = 50 |
|---|---|---|---|
| Multimedia Content #1 | 300 kbps | Selected | |
| Multimedia Content #2 | 450 kbps | Selected | |
| Multimedia Content #3 | 1 Mbps | | Selected |
| Multimedia Content #4 | 400 kbps | Selected | |
| Multimedia Content #5 | 750 kbps | | Selected |

Referring to table 1, the playlist lists the multimedia contents transmitted by the server 100 together with data transfer rates. The transfer rate of each data content is specified in its metadata. Preferably, the metadata is added to a file header of each content file.

When the transfer rate of a wireless link selected for transmitting a specific multimedia content, the stream playback is likely to be cut off frequently. Accordingly, the multimedia streaming service system according to this embodiment selects a wireless link that can accommodate the bit rate of the multimedia content. In a case that both of the wireless links have capability to support the bit rate of the multimedia content, the multimedia streaming service system selects the wireless link that demands less energy consumption.

As shown in table 1, each of the wireless links 1 and 2 has an effective link speed (ELS) and a Power Consumption Value (PCV).

The ELS is an actual bit rate supported in the technical field of communication. All the communication protocols specify a maximum transfer rate. In this embodiment, the ELS refers to a practical transfer rate of the wireless link.

The ELS of the first wireless link (Wireless Link 1) is 500 kbps, and the ELS of the second wireless link (Wireless Link 2) is 5 Mbps. The PCV is a value indicating an energy consumption level of the wireless link for selecting a wireless link having low PCV. Preferably, the PCV can a relative value showing a preference of the wireless link. In this embodiment, the PCV of the first link is 20 and the PCV of the second link is 50.

The multimedia streaming service system selects one of the two wireless links in consideration of the ELS, PCV and the bit rate of each multimedia content.

For instance, the first multimedia content (Multimedia Content #1) requires the transfer rate of 300 kbps, and both the first and second wireless links have sufficient capacity (ELS) enough to accommodate the required transfer rate. In this case, the multimedia streaming service system compares the PCVs of the two wireless links and selects the wireless link having less PCV. Since the first wireless link has a PCV less than that of the second wireless link, the multimedia streaming service system selects the first wireless link.

In the case of the third multimedia content (Multimedia Content #3) having the transfer rate of 1 Mbps, as the first and second wireless links have their individual ELSs of 500 kbps and 5 Mbps, only the second wireless link can secure stable transmission of the third multimedia content, whereby the multimedia streaming service system selects the second wireless link for transmitting the third multimedia content.

Although the link availability is determined only based on the ELS in this embodiment, the link selection can be performed based on another parameters such as a Maximum Link Speed (MLS) or a Current Link Speed (CLS), or based on all of the ELS, MLS, and CLS. Here, the MLS means a maximum transfer rate, and the CLS means a transfer rate measured most recently or a value obtained by accumulating the measured transfer rates.

The multimedia streaming service system first selects the wireless link requiring less power consumption among the wireless link supporting the transfer rate of each multimedia content and switches, when the status of the selected wireless link becomes unstable, another available wireless link is selected. That is, the multimedia streaming service system selects a wireless link in consideration of the transfer rate of the multimedia content to be transmitted and link capacities and energy consumption of the wireless links.

Figure 4:
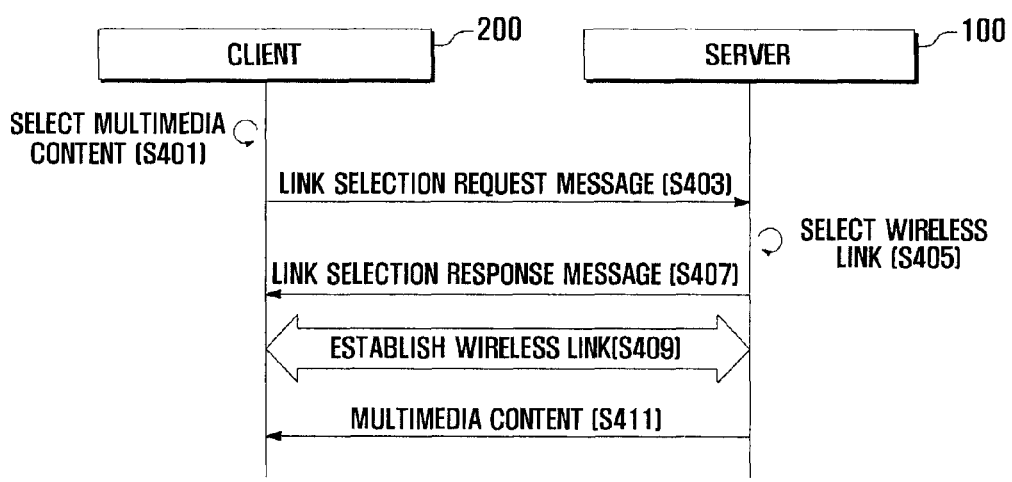
FIG. 4 is a diagram illustrating an initial wireless link selection procedure of the multimedia streaming service system of FIG. 1.

A multimedia streaming service method of the present invention is described hereinafter. FIG. 4 is a diagram illustrating an initial wireless link selection procedure of the multimedia streaming service system of FIG. 1.

Referring to FIG. 4, the client 200 plays a multimedia file in response to a command input by a user (S401). The client 200 has a play list downloaded from the server 100. When a selection command is input, the client 200 selects a multimedia content indicated by the selection command. After selecting the multimedia content, the client 200 sends a Link_Select_Req message for requesting the server 100 to select a wireless link to transmit the selected multimedia content (S403).

Upon receipt of the Link_Select_Req message, the server 100 selects a wireless link appropriate for transmitting the multimedia content (S405). The wireless link selection is performed as described above with reference to table 1. At this time, the server 100 checks the transfer rate of the multimedia content from the metadata of the multimedia content, finds available wireless links that can support the required transfer rate, and selects the wireless link requiring the least power consumption among the available wireless links.

Once a wireless link is selected, the server 100 sends the client 200 a Link_Select_Rsp message containing information on the selected wireless link (407). The wireless link information carried by Link_Select_Rsp message can be identical with that of the previously selected wireless link or the newly selected wireless link. Accordingly, the client 200 receiving the Link_Select_Rsp message can maintain the current wireless link or switch from the current wireless link to the other link depending on the link information obtained from the Link_Select_Rsp message (S409). That is, the current link is maintained when the new link information is identical with the old link information and, otherwise, the current link is switched to the other wireless link. After the wireless link is established, the client 200 receives the multimedia content from the server 100 via the established wireless link (S411).

As described above, the multimedia streaming service method assess the wireless links between the server 100 and the client 200 whenever a multimedia content is requested and selects a wireless link optimal for transmitting the multimedia content, thereby improving service quality and reducing power consumption.

Until now, the initial wireless link selection procedure is described in view of the system. The initial wireless link selection procedure of the multimedia streaming service system is described hereinafter in more detail from the standpoints of the server 100 and the client 200.

Figure 5:
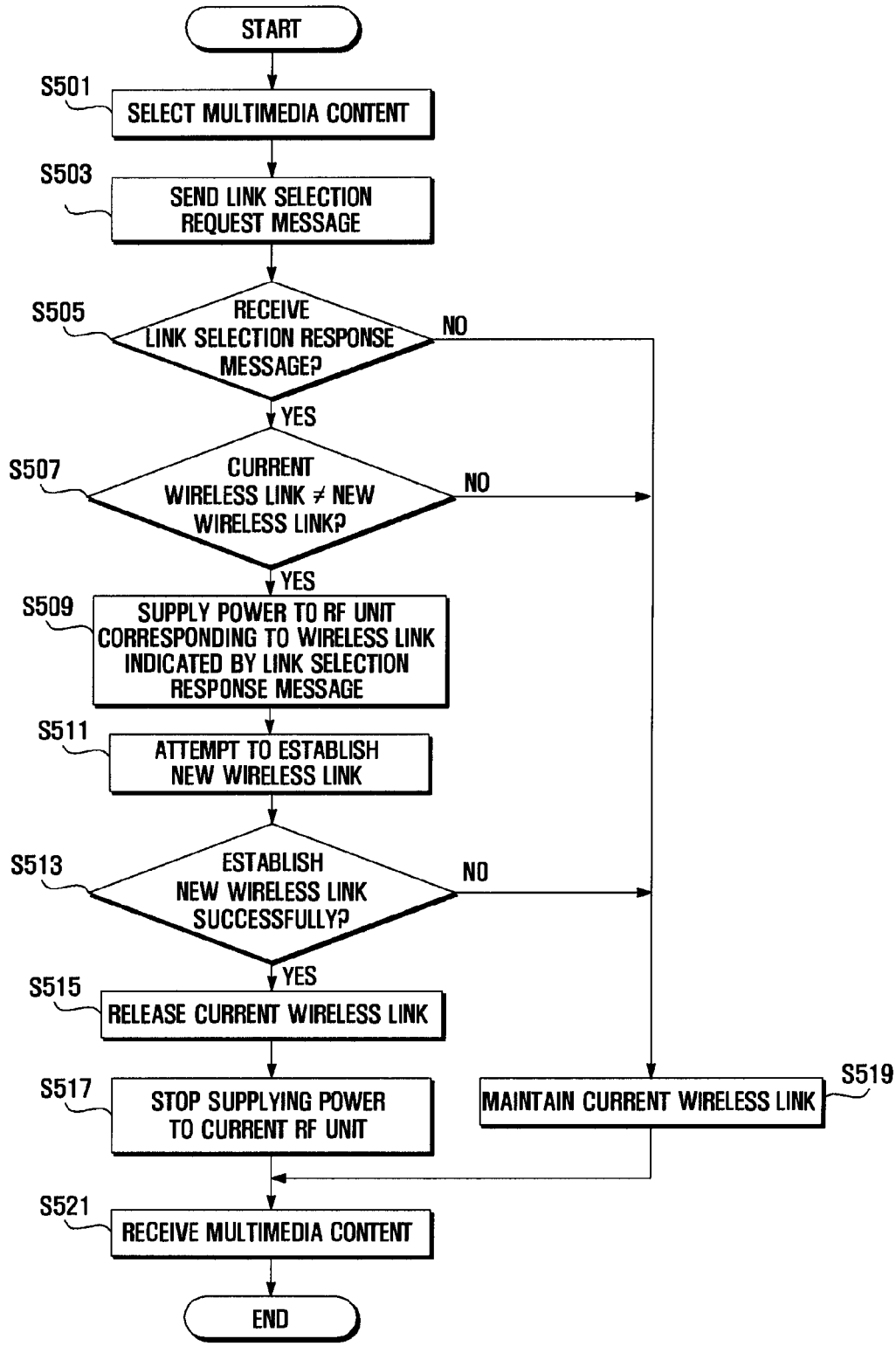
FIG. 5 is a flowchart illustrating an initial wireless link selection procedure of a multimedia streaming service method in view of a client according to an exemplary embodiment of the present invention.

FIG. 5 is a flowchart illustrating an initial wireless link selection procedure of a multimedia streaming service method in view of a client according to an exemplary embodiment of the present invention.

Referring to FIG. 5, the client 200 first selects a multimedia content indicated by a selection command input by a user (S501) and sends the server 100 a Link_Select_Req message containing information about the selected multimedia content (S503). In this embodiment, it is assumed that the first multimedia content (Multimedia Content #1) is selected by the user (see table 1). Accordingly, the Link_Select_Req message contains a content identifier (ID) of the first multimedia content.

If the Link_Select_Req message is received, then the server 100 selects a wireless link for transmitting the multimedia content and sends a Link_Select_Rsp message containing information about the selected wireless link.

After sending the Link_Select_Req message, the client 200 waits for receiving the Link_Select_Rsp message within a predetermined time (S505). If the Link_Select_Req message is received in the predetermined time, then the client 200 determines whether the wireless link indicated by the Link_Select_Req message is identical with the current wireless link (S507). If the Link_Select_Req message is not received in the predetermined time, then the client maintains the current link (S519).

If the wireless link indicated by the Link_Select_Req message differs from the current wireless link at step S507, then the client 200 supplies power to the RF module which is responsible for the wireless link indicated by the Link_Select_ Req message (S509). Otherwise, if the wireless link indicated by the Link_Select_Req message is identical to the current wireless link, then the client 200 maintains the current wireless link (S519).

When the new wireless link reported by the server 100 differs from the current wireless link, the client 200 supplies power to the RF unit corresponding to the new wireless link such that the RF unit attempts to establish the new wireless link with the server 100 (S511). Next, the client 200 determines whether the new wireless link is successfully established with the server 100 (S513).

If the new wireless link is successfully established with the server 200, the client 200 releases the current wireless link (S515) and then stops supplying power to the RF unit responsible for the released wireless link (S517). Consequently, the client 200 receives the multimedia content from the server 100 through the newly established wireless link (S521).

If it fails to establish the new wireless link at step S513, the client 200 maintains the current wireless link (S519) and receives the multimedia content through the current wireless link (S521).

Figure 6:
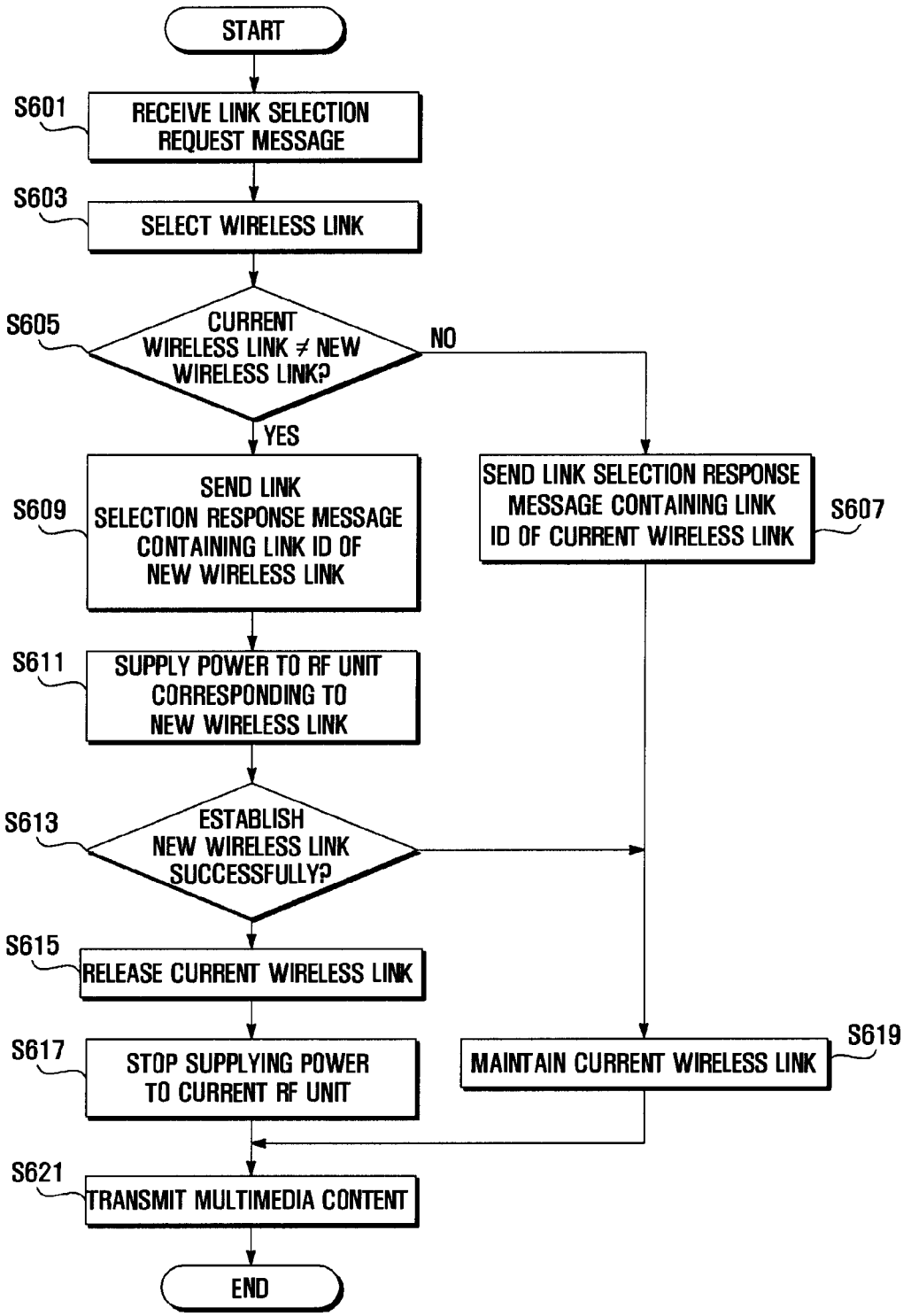
FIG. 6 is a flowchart illustrating an initial wireless link selection procedure of a multimedia streaming service method in view of a server according to an exemplary embodiment of the present invention.

FIG. 6 is a flowchart illustrating an initial wireless link selection procedure of a multimedia streaming service method in view of a server according to an exemplary embodiment of the present invention.

Referring to FIG. 6, the server 100 first receives the Link_Select_Req message transmitted by the client 200 (S601). Upon receipt of the Link_Select_Req message, the server 100 selects an optimal wireless link for transmitting the multimedia content in consideration of the required transfer rate (S603). As aforementioned, the server 100 selects the wireless link which requires the least power consumption among the candidate wireless links that have link capacities sufficient for transmitting the multimedia content.

Next, the server 100 determines whether the newly selected wireless link is the current wireless link established between the client 200 and the server 100 (S605). If the new wireless link is the current wireless link, then the server 100 sends the client 200 a Link_Select_Rsp message containing the information about the current wireless link (S607). Otherwise, if the new wireless link is not the current wireless link, then the server 100 sends the client 200 a Link_Select_Rsp message containing the information about the new wireless link (S609).

After sending the Link_Select_Rsp message at step S609, the server 100 supplies power to the RF module which is responsible for the new wireless link (S611) and determines whether the new wireless link is successively established (S613). If the new wireless link is successfully established, then the server 110 releases the current wireless link (S615) and stops supplying the power to the RF module which is responsible for the current wireless link (S617). Consequently, the server 100 transmits the multimedia content through the newly established wireless link (S621).

If it fails to establish the new wireless link at step S613, the server 100 maintains the current wireless link (S619) and transmits the multimedia content through the current wireless link (S621).

The multimedia streaming service method according to this embodiment enables switching, when the current wireless link becomes unstable, from the current wireless link to the other channel. At this time, the server 100 selects the wireless link requiring the least power consumption among the candidate wireless links, except for the current wireless link, that have the link capacities enough for transmitting the multimedia content.

Figure 7:
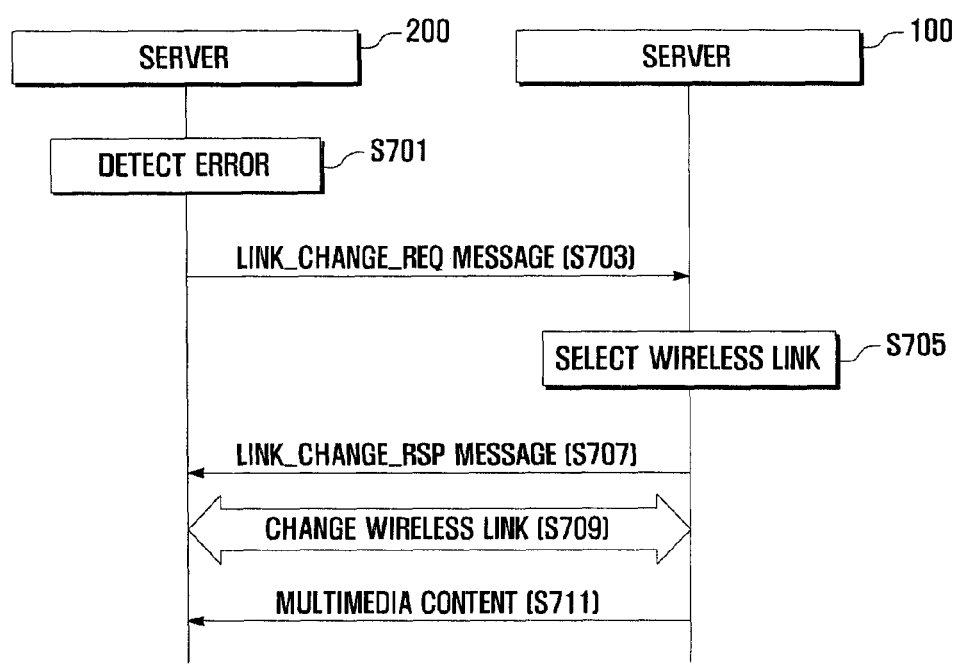
FIG. 7 is a diagram illustrating a wireless link switching procedure of the multimedia streaming service system of FIG. 1.

FIG. 7 is a diagram illustrating a wireless link switching procedure of the multimedia streaming service system of FIG. 1.

In FIG. 7, it is assumed that the client 200 detects at least one missed sequence number on the data stream of the multimedia content transmitted by the server 100. If at least one missed sequence number is detected, the client 200 determines an error has occurred (S701). Upon detection of the error, the client 200 sends a Link_Change_Req message to the server (S703).

If the Link_Change_Req message is received, then the server 100 selects another wireless link appropriate for transmitting the multimedia content (S705). The wireless link selection is performed as described above. At this time, the server 100 checks the transfer rate required for transmitting the multimedia content from the metadata of the content and selects, if the other wireless link supports the transfer rate, the wireless link for transmission.

Once the new wireless link is selected, the server 100 sends the client 200 a Link_Change_Rsp message containing information on the new wireless link (S707). The Link_Change_Rsp message may contain the information about the current wireless link.

If the Link_Change_Rsp message is received, then the client 200 switches to the new wireless link indicated by the Link_Change_Rsp message (S709), i.e. the new wireless link is established between the client 200 and the server 100. Consequently, the client 200 receives the multimedia content through the newly established wireless link (S711).

As aforementioned, when the current wireless link is unstable or predicted to be unstable, the multimedia streaming service system replaces the current wireless channel with a new wireless channel for securing the streaming service quality.

Until now, the wireless link switching procedure is described in view of the system. The wireless link switching procedure is described hereinafter in more detail from the standpoints of the server 100 and the client 200.

Figure 8:
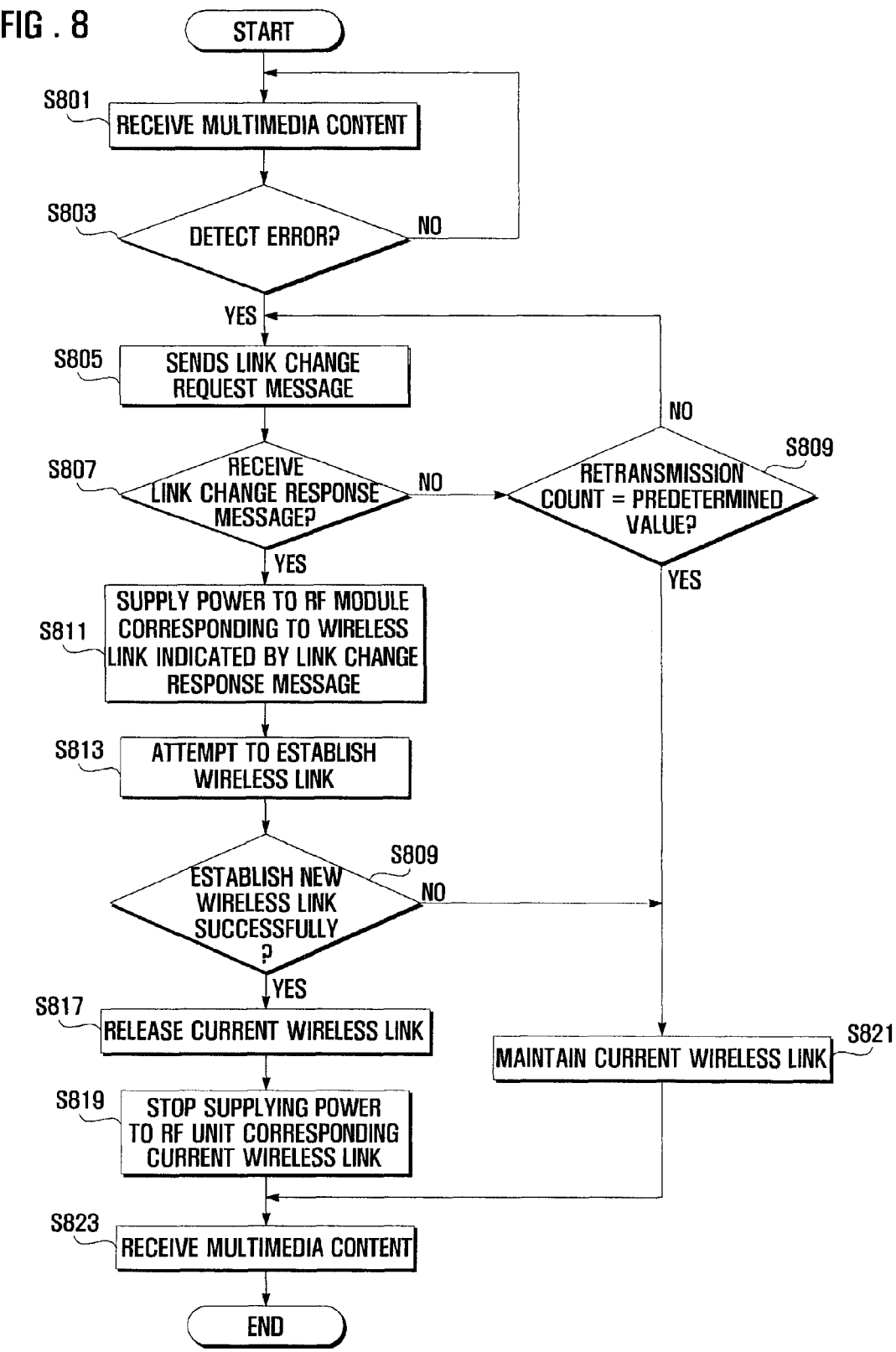
FIG. 8 is a flowchart illustrating a wireless link switching procedure of a multimedia streaming service method in view of a client according to an exemplary embodiment of the present invention.

FIG. 8 is a flowchart illustrating a wireless link switching procedure of a multimedia streaming service method in view of a client according to an exemplary embodiment of the present invention.

Referring to FIG. 8, the client 200 is receiving a multimedia content through a wireless link established with the server 100 by means of one of the first and second RF units 210 and 220. In this embodiment, it is assumed that the current wireless link has been established by means of the first RF unit 210. That is, the client 200 is receiving the multimedia content through the first wireless link. Where receiving the data stream of the multimedia content, the client 100 determines whether an error occurs (S803). When at least one missed sequence number is detected in the received data stream, the client 200 determines that an error has occurred. If an error is detected at step S803, the client 200 sends a Link_Change_Req message to the server 100 (S805). Preferably, the Link_Change_Req message contains a list of wireless links supported at the client 200.

If the Link_Change_Req message is received, then the server 100 selects another wireless link appropriate for transmitting the multimedia content and sends the client 200 a Link_Change_Rsp message containing information on the selected wireless link. Since the multimedia content has been transmitted through the first wireless link, the server 100 selects the second wireless link. The Link_Change_Rsp message can be transmitted through the second wireless link. In a case that the second link does not support the transfer rate of the multimedia content, the server 100 may not send the Link_Change_Rsp message.

After sending the Link_Change_Req message, the client 200 waits for receiving the Link_Change_Rsp message in a predetermined time (S807). If no Link_Change_Rsp message is received, then the client 200 increments a retransmission count (S809) and repeats steps S805 and S807. The transmission of the Link_Change_Req message is repeated a predetermined number of times.

The client 200 determines whether the retransmission count is equal to the predetermined number of times at step S809 and, when the transmission count is equal to the predetermined number of times, maintains the current wireless link (S821). Otherwise, if the retransmission count is not equal to the predetermined number of times, repeats transmission of the Link_Change_Req message.

If the Link_Change_Rsp message is received at step S807, then the client 200 supplies power to the RF unit which is responsible for the wireless link indicated by the Link_Change_Rsp message, i.e. the second RF unit 220 (S811). Next, the client 200 attempts to establish the second wireless link with the server 100 by means of the second RF unit 220 (S813) and determines whether the second wireless link is successfully established (S815).

If the second wireless link is successfully established, then the client 200 releases the first wireless link (S817). Otherwise, if it fails to establish the second link, then the client 200 maintains the first wireless link (S821).

After releasing the first wireless link at step S817, the client 200 stops supplying power to the first RF unit 210 (S819).

Consequently, the client 200 receives the multimedia content through the second link (S823). Whereas, when it fails to establish the second link, the client 200 continues receiving the multimedia content through the first link at step S823.

FIG. 9 is a flowchart illustrating a wireless link switching procedure of a multimedia streaming service method in view of a server according to an exemplary embodiment of the present invention.

Referring to FIG. 9, the server 100 receives the Link_Change_Req message transmitted by the client 200 (S901). Upon receipt of the Link_Change_Req message, the server 100 selects a wireless link for transmitting the multimedia content (S903). At this time, the server 100 selects the wireless link which requires the least power consumption among the wireless links that have the link capacities enough for transmitting the multimedia content.

Once a wireless link is selected, the server 100 determines whether the selected wireless link supports the transfer rate of the multimedia content (S905). If the selected wireless link does not support the transfer rate of the multimedia content, the server 100 maintains the current wireless link (S917) and transmits the multimedia content through the current wireless link (S919).

Otherwise, if the selected wireless link supports the transfer rate of the multimedia content, the server 100 sends the client 200 a Link_Change_Rsp message containing information about the selected wireless link (S907). Next, the server 100 supplies power to the RF module which is responsible for the selected wireless link (S909) and determines whether the selected wireless link is established successfully (S911). If the selected wireless link is successfully established, the server 100 releases the current wireless link (S913) and stops supplying power to the RF module that is responsible for the current wireless link (S915). Consequently, the server 100 transmits the wireless content to the client 200 through the newly established wireless link (919). If it fails to establish the selected wireless link at step S911, the server maintains the current wireless link (S917) and transmits the multimedia content through the current wireless link at step S919.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the multimedia streaming service system and method of the present invention enables to switch between the wireless links for providing a multimedia service in consideration of the transfer rate required for transmitting a multimedia content and power consumption and link capacity of the wireless links, thereby securing seamless multimedia streaming service and reducing power consumption and, in turn, improving streaming service utilization.

What is claimed is:

1. A streaming service method for a system including a server and at least one client configured to establish at least two wireless links with each other, comprising:
   sending a link selection request message containing a content identifier from the client to the server;
   selecting, at the server, one of the wireless links for transmitting a content indicated by the content identifier;
   sending a link selection response message containing a link identifier of the selected wireless link from the server to the client; and
   receiving, at the client, the content transmitted by the server through the selected wireless link established with reference to the link identifier.

2. The streaming service method of claim 1, wherein selecting one of the wireless links comprises:
   checking data transfer rates and power consumption factors of the wireless links; and
   selecting one of the at least two wireless links having a data transfer rate greater than the data transfer rate of the content and a power consumption factor less than that of remaining ones of the at least two wireless links.

3. The streaming service method of claim 2, wherein the data transfer rate is one of a maximum data transfer rate, a practical data transfer rate, and a previously measured data transfer rate of the selected wireless link.

4. The streaming service method of claim 1, wherein the wireless links comprise a Wireless Local Area Network (WLAN) link, a Bluetooth link, and a Ultra Wideband (UWB) link.

5. A streaming service method for a system including a server and at least one client configured to establish at least two wireless links with each other, comprising:
   determining, at the client, whether a data stream of a content received from the server is cut off;
   sending, if the data stream is cut off, a link change request message from the client to the server;
   selecting, at the server, one of the wireless links, except for a current wireless link, upon receiving the link change request message;
   sending a link change response message containing a link identifier of the selected wireless link from the server to the client;
   switching the current wireless link to the selected wireless link between the client and the server; and
   receiving, at the client, the content transmitted by the server through the selected wireless link.

6. The streaming service method of claim 5, wherein selecting one of the wireless links comprises:
   selecting one of the wireless links having a data transfers rates greater than the data transfer rate of the content; and
   selecting the wireless link having a power consumption factor less than that of the other wireless links.

7. The streaming service method of claim 6, wherein the data transfer rate is one of a maximum data transfer rate, a practical data transfer rate, and a previously measured data transfer rate of the selected wireless link.

8. The streaming service method of claim 5, wherein the at least two wireless links comprises at least two of a Wireless Local Area Network (WLAN) link, a Bluetooth link, and an Ultra Wideband (UWB) link.

9. A streaming service system comprising:
   a server which selects, after receiving a link selection request message, one of a plurality of wireless links for transmitting a content indicated by a content identifier contained in the link selection request message and sends a link selection response message containing a link identifier indicating the selected wireless link in response to the link selection request message; and
   a client which sends the link selection request message to the server and receives a data stream of the content transmitted by the server through the selected wireless link indicated by the link identifier contained in the link selection response message.

10. The streaming service system of claim 9, wherein the server selects one of the plurality of wireless links having a data transfer rate greater than the data transfer rate of the content and a power consumption factor less than that of remaining ones of the plurality of wireless links.

11. The streaming service system of claim 10, wherein the data transfer rate is one of a maximum data transfer rate, a practical data transfer rate, and a previously measured data transfer rate of one of the plurality of wireless links.

12. The streaming service system of claim 10, wherein the client detects whether the data stream is cut off and sends, if the data stream is cut off, a link change request message to the server.

13. The streaming service system of claim 12, wherein the server selects, when received the link change request message, one of the wireless links, except for the current wireless link, and sends the client a link change response message containing a link identifier indicating the selected wireless link.

14. The streaming service system of claim 13, wherein the server selects one of the plurality of wireless links having a data transfers rate greater than the data transfer rate of the content and selects one of the plurality of wireless links having a power consumption factor that is less than that of remaining ones of the plurality of wireless links.

15. The streaming service system of claim 13, wherein the client receives the content through the wireless link indicated by the link identifier contained in the link change response message.

16. The streaming service system of claim 13, wherein the plurality of wireless links comprise a Wireless Local Area Network (WLAN) link, a Bluetooth link, and an Ultra Wideband (UWB) link.

17. A server for a system providing a streaming service, comprising:
   a plurality of radio frequency modules, each configured to establish one of a plurality of wireless links with a client;
   a link control module which selects one of the radio frequency modules; and
   a controller which selects one of the wireless links to transmit a content to the client, and controls the link control module to activate the radio frequency module which is responsible for establishing the selected wireless link;
   wherein the controller selects the one of the wireless links and controls transmission of a link identifier of the selected wireless link to the client, in response to at least one of:
   (i) a link selection request message received from the client, containing a content identifier; and
   (ii) a link change request message received from the client, which is transmitted by the client if a data stream of content transmitted by the server over a current one of the wireless links is cut off.

18. The server of claim 17, further comprising a storage module which stores the content, wherein the controller controls transmission of the content through the wireless link established by means of the activated radio frequency module.

19. A client for a system providing a streaming service, comprising:
 a plurality of radio frequency units which establish individual wireless links;
 a link selection unit which selects one of the radio frequency units for receiving a content transmitted by a server;
 a control unit which controls the link selection unit to activate the radio frequency module for establishing the wireless link indicated by a link selection message received from the server;
 an audio processing unit which processes an audio stream of the content receiving from the server; and
 a display unit which displays a video stream of the content,
 wherein the control unit controls the activated radio frequency module to output the audio and video streams of the content to the respective audio processing unit and the display unit and further controls the link selection unit to perform at least one of:
 (i) when the audio or video stream is cut off, sending a link change request message to the server; and
 (ii) sending a link selection request message containing a content identifier to the server, wherein content indicated by the content identifier that is thereafter responsively transmitted by the server, is received at the client.

20. The client of claim 19, wherein the content is received at the client responsive to the link selection message containing the content identifier, and thereafter, when the audio or video stream is cut off, the link selection unit performs the sending a link change request message to the server.

21. A receiving device comprising:
 a plurality of receiving units each operating on known frequency and protocol;
 a processor in communication with a memory, the memory including code, which when accessed by the processor causes the processor to:
 monitor a data stream of content received by a current one of said receiving units;
 determining whether said data stream of content is cut off;
 sending a link change request message after determining said data stream has been cut off;
 receiving a link change response message containing a link identifier of a selected receiving unit;
 switching the current receiving unit to the selected receiving unit; and
 receiving the data stream content through the selected receiving unit.

22. The device of claim 21, wherein said determining whether said data stream of content is cut off is based on missing at least one data block in said data stream of content.

* * * * *

UNITED STATES PATENT AND TRADEMARK OFFICE
CERTIFICATE OF CORRECTION

PATENT NO.        : 8,223,690 B2                          Page 1 of 1
APPLICATION NO.   : 12/351090
DATED             : July 17, 2012
INVENTOR(S)       : Taek Jung Kwon It is certified that error appears in the above-identified patent and that said Letters Patent is hereby corrected as shown below:

Column 13, Claim 6, Line 52, should read as follows:
--...having a data transfer...--

Column 13, Claim 6, Line 53, should read as follows:
--...rate greater than the data...--

Column 14, Claim 14, Line 32, should read as follows:
--...data transfer rate...--

Signed and Sealed this
Sixth Day of November, 2012

David J. Kappos
*Director of the United States Patent and Trademark Office*